(12) United States Patent (10) Patent No.: US 12,513,040 B2
Zhang (45) Date of Patent: Dec. 30, 2025

(54) MANAGEMENT IP DRIFT METHOD AND STORAGE FRAME

(71) Applicant: Suzhou MetaBrain Intelligent Technology Co., Ltd., Jiangsu (CN)

(72) Inventor: Zhongyun Zhang, Jiangsu (CN)

(73) Assignee: Suzhou MetaBrain Intelligent Technology Co., Ltd., Jiangsu (CN)

(*) Notice: Subject to any disclaimer, the term of this patent is extended or adjusted under 35 U.S.C. 154(b) by 0 days.

(21) Appl. No.: 18/875,331

(22) PCT Filed: Sep. 26, 2023

(86) PCT No.: PCT/CN2023/121331
§ 371 (c)(1),
(2) Date: Dec. 16, 2024

(87) PCT Pub. No.: WO2024/148853
PCT Pub. Date: Jul. 18, 2024

(65) Prior Publication Data
US 2025/0323823 A1    Oct. 16, 2025

(30) Foreign Application Priority Data

Jan. 10, 2023   (CN) .......................... 202310035250.8

(51) Int. Cl.
*G06F 8/65* (2018.01)
*G06F 8/71* (2018.01)
(Continued)

(52) U.S. Cl.
CPC ...... *H04L 41/0663* (2013.01); *H04L 61/5007* (2022.05)

(58) Field of Classification Search
None
See application file for complete search history.

(56) References Cited

U.S. PATENT DOCUMENTS 9,378,461 B1 *  6/2016  Chatterjee ............. G06F 9/5005
9,552,198 B2 *  1/2017  Kuchibhotla ........... H04W 4/60
(Continued)

FOREIGN PATENT DOCUMENTS

CN     104731727 A    6/2015
CN     107070699 A    8/2017
(Continued)

OTHER PUBLICATIONS

International Search Report cited in PCT/CN2023/121331, mailed Dec. 11, 2023, 5 pages.
(Continued)

*Primary Examiner* — Christopher B Robinson
(74) *Attorney, Agent, or Firm* — Cooper Legal Group, LLC (57) ABSTRACT

The present application relates to a management Internet protocol (IP) drift method and a storage frame. The method is applied to a manager. The manager is interconnected with at least two controllers. The method includes: deploying a management IP to a target controller, where the controllers include the target controller, and the target controller is unique; receiving a management IP drift request, and obtaining a state attribute of a controller; and if the state attribute of the controller satisfies a management IP drift rule, causing the management IP to drift based on the management IP drift request.

20 Claims, 6 Drawing Sheets

(51) Int. Cl.
*H04L 41/0663* (2022.01)
*H04L 61/5007* (2022.01)
*H04W 28/00* (2009.01)

(56) References Cited

U.S. PATENT DOCUMENTS

| | | |
|---|---|---|
| 2003/0036387 A1 | 2/2003 | Kovacs et al. |
| 2016/0092210 A1* | 3/2016 | Kuchibhotla ............. G06F 8/61 717/121 |
| 2016/0173525 A1* | 6/2016 | Thomas ................ H04L 63/145 726/23 |
| 2019/0324797 A1 | 10/2019 | Miao |
| 2020/0073656 A1* | 3/2020 | Satapathy ................. G06F 8/71 |
| 2022/0014963 A1* | 1/2022 | Yeh ........................ G06N 3/045 |
| 2022/0051129 A1* | 2/2022 | Malvankar ............ G06F 9/4881 |

FOREIGN PATENT DOCUMENTS

| | | |
|---|---|---|
| CN | 109286583 A | 1/2019 |
| CN | 112153167 A | 12/2020 |
| CN | 113783712 A | 12/2021 |
| CN | 115733737 A | 3/2023 |
| TW | I547947 B | 9/2016 |

OTHER PUBLICATIONS

Written Opinion cited in PCT/CN2023/121331, mailed Dec. 11, 2023, 8 pages.
First Office Action cited in CN202310035250.8, mailed Mar. 14, 2023, 8 pages.
Notification to Grant Patent Right for Invention cited in CN202310035250.8, mailed Apr. 7, 2023, 4 pages.

* cited by examiner

MANAGEMENT IP DRIFT METHOD AND STORAGE FRAME

CROSS-REFERENCE TO RELATED APPLICATION

This application claims priority to Chinese Patent Application No. 202310035250.8, filed with the China National Intellectual Property Administration on Jan. 10, 2023 and entitled "MANAGEMENT IP DRIFT METHOD AND STORAGE FRAME", which is incorporated herein by reference in its entirety.

FIELD

The present application relates to the field of computer cluster technologies, and in particular, to a management Internet protocol (IP) drift method and a storage frame.

BACKGROUND

At least one management network interface in a storage frame usually needs to be connected to a network of a customer, helping the customer manage devices of storage manufacturers. For high reliability in a centralized storage device, a controller redundancy design is usually used. Generally, a two-controller redundancy design is used. In this case, a management IP of the storage frame for external communication needs to complete a management IP drift function in two controllers, so that when one controller fails, the management IP can drift to the other controller, to avoid hosting of the entire frame and complete an IP drift function between the two controllers.

A management IP drift method in the prior art includes: mirroring management data between the two controllers, then performing IP arbitration based on mirroring of the management data, and finally determining which controller to deploy the management IP. With the development of storage services, the customer has made an increasing requirement for data reliability. To meet the high reliability requirement of the customer, the storage manufacturer has designed a storage frame including four controllers, to ensure that the storage frame can still work normally in case of damages to three of the four controllers (three of the four controllers are damaged). However, the management IP drift method in the prior art is applicable to only a storage frame including two controllers, and when there are excessive controllers, it is extremely difficult to implement IP arbitration based on mirroring of the management data.

SUMMARY

Based on this, there is a need to provide, for the foregoing technical problems, a management IP drift method and a storage frame, which can reduce difficulty in management IP drift and improve reliability and stability of the storage frame.

According to a first aspect, there is provided a management IP drift method. The method is applied to a manager. The manager is interconnected with at least two controllers. The method includes: deploying a management IP to a target controller, where the controllers include the target controller, and the target controller is unique; receiving a management IP drift request, and obtaining a state attribute of a controller; and if the state attribute of the controller satisfies a management IP drift rule, causing, based on the management IP drift request, the management IP to drift.

In one embodiment, the deploying a management IP to a target controller includes: receiving, by the manager, management IP obtaining requests sent by the controllers, where the management IP drift request includes the management IP obtaining request; and obtaining, by the manager, the target controller corresponding to a management IP obtaining request that is received first, and deploying the management IP to the target controller.

In one embodiment, the deploying a management IP to a target controller further includes: receiving, by the manager, a management IP setting request delivered by a user, where the management IP drift request includes the management IP setting request; and obtaining, by the manager, the target controller corresponding to the management IP setting request, and deploying the management IP to the target controller.

In one embodiment, the receiving a management IP drift request, and obtaining a state attribute of a controller includes: receiving, by the manager, the management IP setting request delivered by the user, and obtaining a state attribute of a controller corresponding to the management IP setting request; receiving, by the manager, a management IP obtaining request sent by a default controller, and obtaining a state attribute of the target controller, where the default controller is a controller other than the target controller; and receiving, by the manager, a management IP abandonment request sent by the target controller, and obtaining a state attribute of the default controller.

In one embodiment, the management IP drift rule includes: when the management IP drift request is the management IP abandonment request sent by the target controller, causing the management IP to drift to the default controller whose state attribute is normal.

In one embodiment, the management IP drift rule includes: when the management IP drift request is the management IP obtaining request sent by the default controller, and the state attribute of the target controller is abnormal, causing the management IP to drift to the default controller.

In one embodiment, the management IP drift rule includes: when the management IP drift request is the management IP setting request delivered by the user, and the state attribute of the controller corresponding to the management IP setting request is normal, causing the management IP to drift to the controller corresponding to the management IP setting request.

In one embodiment, the method further includes: when the default controller monitors that a state attribute of a controller other than the default controller is abnormal, sending, by the default controller, the management IP obtaining request to the manager.

In one embodiment, the method further includes: when the manager monitors that a state attribute of any controller is abnormal, receiving, by the manager, the management IP obtaining request sent by the default controller.

In one embodiment, the method further includes: releasing management IP drift permission of the controller. The releasing management IP drift permission of the controller includes: obtaining a state attribute of the controller, and when the state attribute of the controller is abnormal, releasing the management IP drift permission of the controller.

In one embodiment, the obtaining a state attribute of the controller, and when the state attribute of the controller is abnormal, releasing the management IP drift permission of the controller includes: obtaining, by the controller, the state attribute of the controller, and when the state attribute of the controller is abnormal, sending a management IP drift release request to the manager, so that the manager releases the management IP drift permission of the controller.

In one embodiment, the obtaining a state attribute of the controller, and when the state attribute of the controller is abnormal, releasing the management IP drift permission of the controller includes: obtaining, by the manager, the state attribute of the controller, and when the state attribute of the controller is abnormal, releasing, by the manager, the management IP drift permission of the controller.

In one embodiment, the obtaining, by the manager, the state attribute of the controller, and when the state attribute of the controller is abnormal, releasing, by the manager, the management IP drift permission of the controller includes: receiving, by the manager based on a preset management IP drift request receiving period, a management IP drift request sent by the default controller; and when the manager does not receive, within the preset management IP drift request receiving period, the management IP drift request sent by the default controller, releasing the management IP drift permission of the controller.

In one embodiment, the obtaining a state attribute of the controller includes: when the controller is the target controller, ascertaining whether a system management port corresponding to the target controller has an error code and whether a system management link on which the target controller is located is down; and if the system management port corresponding to the target controller has the error code and/or the system management link on which the target controller is located is down, determining that the state attribute of the target controller is abnormal; or if the system management port corresponding to the target controller does not have the error code and/or the system management link on which the target controller is located is not down, determining that the state attribute of the target controller is normal.

In one embodiment, the obtaining a state attribute of the controller further includes: when the controller is the default controller, ascertaining whether a system management link on which the default controller is located is down; and if the system management link on which the default controller is located is down, determining that the state attribute of the default controller is abnormal; or if the system management link on which the default controller is located is not down, determining that the state attribute of the default controller is normal.

In one embodiment, the manager includes a master manager and a slave manager. The method further includes: establishing a heartbeat connection to the master manager and the slave manager; and when the master manager is in a normal state, performing the following steps based on the master manager: deploying a management IP to a target controller, where the controllers include the target controller, and the target controller is unique; receiving a management IP drift request, and obtaining a state attribute of a controller; and causing the management IP to drift based on the state attribute of the controller and the management IP drift request; or when the master manager is not in a normal state, performing the following steps based on the slave manager: deploying a management IP to a target controller, where the controllers include the target controller, and the target controller is unique; receiving a management IP drift request, and obtaining a state attribute of a controller; and causing the management IP to drift based on the state attribute of the controller and the management IP drift request.

According to a second aspect, there is provided a storage frame. The storage frame includes controllers and a manager.

The manager is configured to deploy a management IP to a target controller, where the controllers include the target controller, and the target controller is unique.

The manager is further configured to receive a management IP drift request, and obtain a state attribute of the controller.

The manager is further configured to: if the state attribute of the controller satisfies a management IP drift rule, cause the management IP to drift based on the management IP drift request.

According to a third aspect, there is provided a computer device, including a memory, a processor, and a computer program stored in the memory and runnable on the processor, where when the processor executes the computer program, the following steps are implemented:

deploying a management IP to a target controller, where controllers include the target controller, and the target controller is unique;

receiving a management IP drift request, and obtaining a state attribute of a controller; and if the state attribute of the controller satisfies a management IP drift rule, causing the management IP to drift based on the management IP drift request.

According to a fourth aspect, there is provided a non-volatile computer-readable storage medium having stored thereon a computer program, where when the computer program is executed by a processor, the following steps are implemented:

deploying a management IP to a target controller, where controllers include the target controller, and the target controller is unique;

receiving a management IP drift request, and obtaining a state attribute of a controller; and if the state attribute of the controller satisfies a management IP drift rule, causing the management IP to drift based on the management IP drift request.

According to the management IP drift method and the storage frame, the method includes: deploying the management IP to the target controller, where the controllers include the target controller, and the target controller is unique; receiving a management IP drift request, and obtaining the state attribute of the controller; and if the state attribute of the controller satisfies the management IP drift rule, causing the management IP to drift based on the management IP drift request. According to the management IP drift method, the management IP is stored in a baseboard management controller of the manager, and the manager causes the management IP to drift based on the management IP drift request sent by the controller and the state attribute of the controller. The method has the following beneficial effects.

First, the problem of hosting of the entire storage frame during use by a customer because a state attribute of a controller having the management IP is abnormal or a link on which a controller having the management IP is located is down is solved.

Second, the management IP is stored in the baseboard management controller of the manager, whereby the technical shortcoming in the prior art that management IP arbitration can be implemented only through data mirroring is overcome.

Third, the technical difficulty in management IP drift in the prior art is reduced, and reliability of management IP drift is improved.

Finally, the management IP drift method of the present application has a larger application range, and can be applied to an application scenario in which one frame includes a plurality of controllers.

DETAILED DESCRIPTION

In order to make objectives, technical solutions, and advantages of the present application clearer, the following further describes the present application in detail with reference to the accompanying drawings and embodiments. It should be understood that specific embodiments described herein are merely used to explain the present application but are not intended to limit the present application.

Embodiment 1

Figure 1:
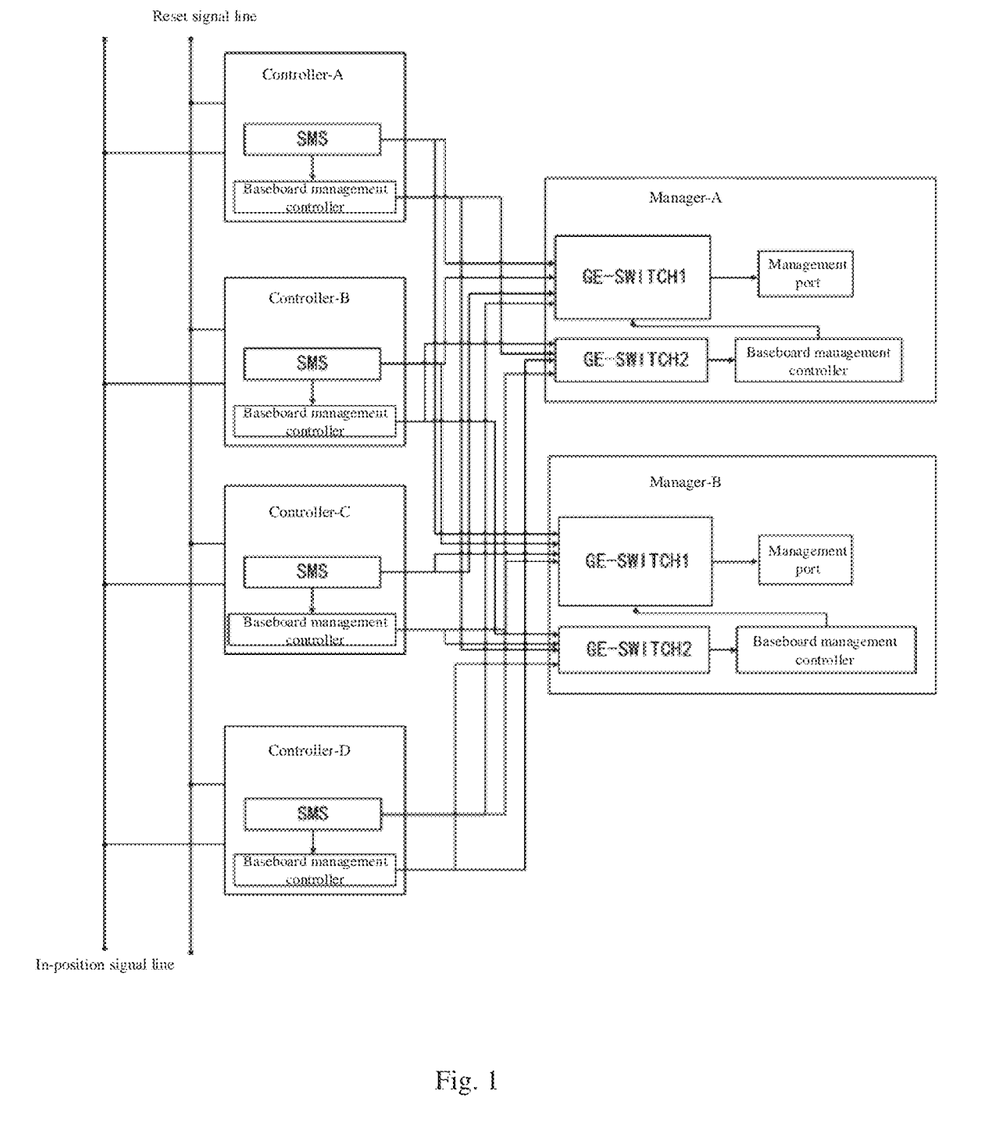
FIG. 1 is a schematic diagram of a structure of a storage frame according to an embodiment.

A management IP drift method provided in the present application can be applied to a storage frame shown in FIG. 1. As shown in FIG. 1, the storage frame includes four controllers and two managers. Any two controllers are interconnected through a network, and each controller is in communication connection to each manager. The two managers are redundancies of each other. The manager includes a baseboard management controller and a network switching chip (GE-SWITCH). The GE-SWITCH includes a GE-SWITCH 1 and a GE-SWITCH 2. The GE-SWITCH 2 is in communication connection to the baseboard management controller. The controller includes a baseboard management controller and a system management software (SMS) unit. The SMS is in communication connection to a system management port of the storage frame via the GE-SWITCH 1. The baseboard management controller is in communication connection to the baseboard management controller of the manager via the GE-SWITCH 2. The management IP drift method includes the following steps:

starting the SMS in the controller, and sending, by the controller, a management IP obtaining request to the manager;

deploying, by the manager, a management IP to a target controller, where the controllers include the target controller, and the target controller is unique;

receiving a management IP drift request, and obtaining a state attribute of the controller; and if the state attribute of the controller satisfies a management IP drift rule, causing the management IP to drift based on the management IP drift request.

Figure 2:
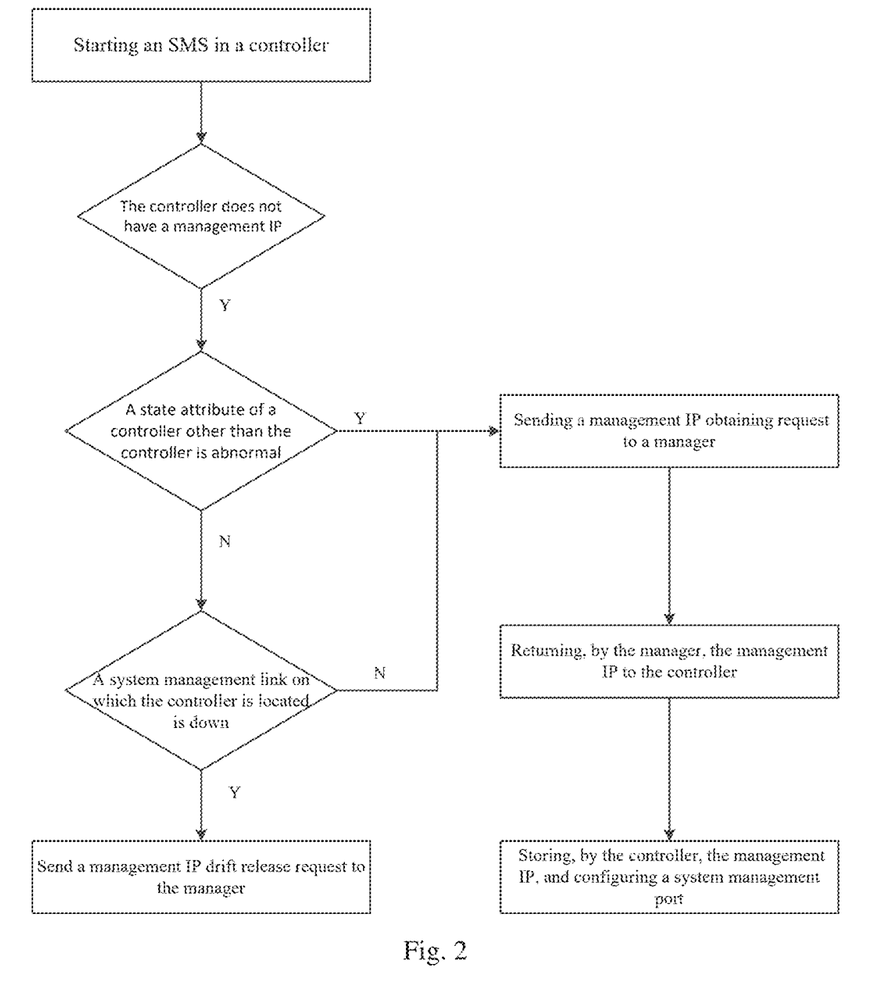
FIG. 2 is a schematic flowchart of a management IP drift method according to an embodiment.

In one embodiment, as shown in FIG. 2, the management IP drift method includes: starting the SMS in the controller; detecting whether the controller has the management IP; and if the controller does not have the management IP, sending a management IP obtaining request to the manager; or if the controller has the management IP, obtaining, by the controller, whether a state attribute of a controller other than the controller is abnormal; and if the state attribute of the controller other than the controller is abnormal, sending a management IP obtaining request to the manager; or if the state attribute of the controller other than the controller is normal, ascertaining whether a system management link on which the controller is located is down; and if the system management link on which the controller is located is down, sending a management IP release request to the manager; or if the system management link on which the controller is located is not down, sending a management IP obtaining request to the manager.

Figure 3:
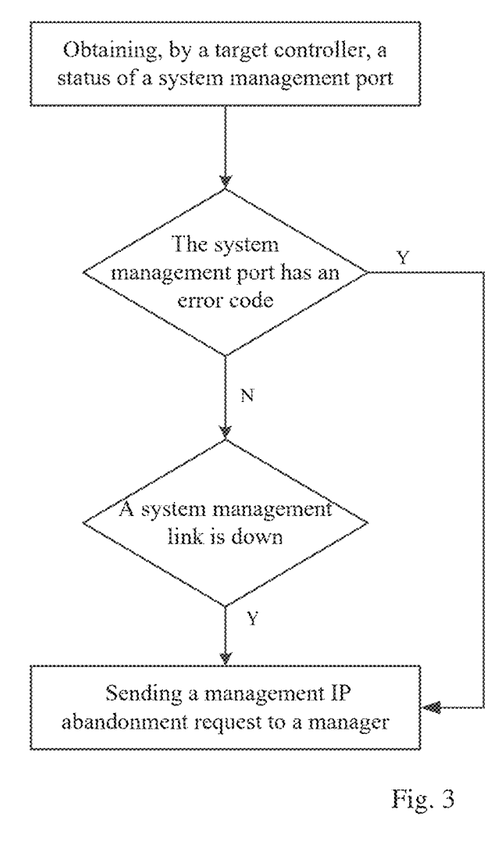
FIG. 3 is a schematic flowchart of a management IP drift method according to an embodiment.

In one embodiment, as shown in FIG. 3, the method further includes: obtaining, by a target controller, a status of the system management port; and if the system management port has an error code, sending a management IP abandonment request to the manager; or if the system management port does not have the error code, determining whether a system management link is down; and if the system management link is down, sending a management IP abandonment request to the manager.

Figure 4:
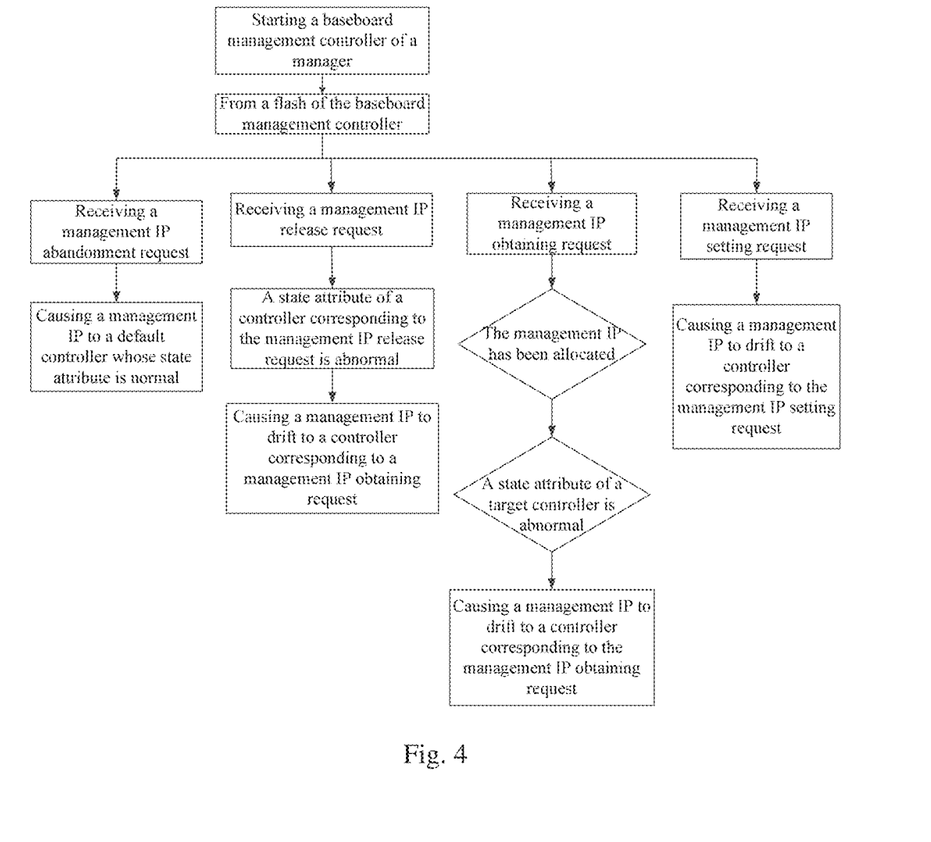
FIG. 4 is a schematic flowchart of a management IP drift method according to another embodiment.

In one embodiment, as shown in FIG. 4, the method further includes: starting the baseboard management controller of the manager, and reading the management IP from a flash of the baseboard management controller; receiving a management IP abandonment request sent by the target controller, a management IP release request sent by the controller, a management IP obtaining request sent by a default controller, and a management IP setting request delivered by a user; causing, by the baseboard management controller of the manager based on the management IP abandonment request sent by the target controller, the management IP to drift to the default controller whose state attribute is normal; releasing, by the baseboard management controller of the manager based on the management IP release request sent by the controller, management IP drift permission of the controller corresponding to the management IP release request; receiving, by the baseboard management controller of the manager, the management IP obtaining request sent by the controller, and determining whether the management IP has been allocated; if the management IP has been allocated to the target controller, determining whether a state attribute of the target controller is abnormal, or if the management IP has not been allocated to the target controller, deploying the management IP to any default controller; if the state attribute of the target controller is abnormal, causing the management IP to drift to the controller corresponding to the management IP obtaining request; and receiving, by the baseboard management controller of the manager, the management IP setting request delivered by the user, and causing the management IP to drift to the controller corresponding to the management IP setting request. It should be understood that the reading the management IP from a flash of the baseboard management controller further includes reading the target controller to which the management IP is to be allocated.

In one embodiment, the deploying a management IP to a target controller includes: delivering, by the controllers, management IP obtaining request to the manager in response to a storage frame start instruction; obtaining, by the manager, the management IP obtaining requests delivered by the controllers, where a controller corresponding to a management IP obtaining request that is received first is defined as the target controller; and deploying the management IP to the target controller. It should be understood that the target controller is unique, that is, in an actual application, the management IP can be deployed on only one controller.

In one embodiment, the deploying a management IP to a target controller further includes: presetting the target controller, and storing attribute information of the target controller in a flash of the baseboard management controller of the manager; and when a storage frame start instruction is detected, reading the attribute information of the target controller from the flash, and deploying the management IP to the target controller.

In one embodiment, the deploying a management IP to a target controller further includes: delivering, by a user, a management IP setting request to the manager; and deploying, by the manager, the management IP to the target controller based on the target controller corresponding to the management IP setting request. It should be understood that if the flash of the baseboard management controller of the manager stores the attribute information of the target controller, the management IP is directly deployed to the target controller, or if the flash of the baseboard management controller of the manager does not store the attribute information of the target controller, the management IP is deployed to the target controller based on the management IP setting request delivered by the user or the management IP obtaining requests sent by the controllers. In addition, it should be understood that no matter the management IP drift request is the management IP setting request delivered by the user or the management IP obtaining requests sent by the controllers, the management IP drift request carries attribute information of the controller corresponding to the management IP drift request.

In one embodiment, after the management IP is deployed to the target controller, the management IP drift request continues to be received, and the state attribute of the controller is obtained. The management IP drift request includes the management IP setting request delivered by the user, the management IP abandonment request sent by the target controller, the management IP obtaining request sent by the default controller, and the management IP release request sent by the controller.

In one embodiment, the receiving a management IP drift request, and obtaining a state attribute of a controller includes: receiving, by the manager, the management IP drift request, and after receiving the management IP drift request, obtaining the state attribute of the controller; or when the manager monitors that the state attribute of the controller is abnormal, receiving the management IP drift request.

In one embodiment, the receiving, by the manager, the management IP drift request, and after receiving the management IP drift request, obtaining the state attribute of the controller includes: the receiving a management IP drift request, and obtaining a state attribute of a controller includes: receiving, by the manager, the management IP setting request delivered by the user, and obtaining a state attribute of a controller corresponding to the management IP setting request; receiving, by the manager, a management IP obtaining request sent by a default controller, and obtaining a state attribute of the target controller, where the default controller is a controller other than the target controller; and receiving, by the manager, a management IP abandonment request sent by the target controller, and obtaining a state attribute of the default controller.

In one embodiment, the management IP drift rule includes: when the management IP drift request is the management IP abandonment request sent by the target controller, causing the management IP to drift to the default controller whose state attribute is normal.

In one embodiment, the management IP drift rule includes: when the management IP drift request is the management IP obtaining request sent by the default controller, and the state attribute of the target controller is abnormal, causing the management IP to drift to the default controller.

In one embodiment, the management IP drift rule includes: when the management IP drift request is the management IP setting request delivered by the user, and the state attribute of the controller corresponding to the management IP setting request is normal, causing the management IP to drift to the controller corresponding to the management IP setting request.

In one embodiment, the method further includes: when the default controller monitors that a state attribute of a controller other than the default controller is abnormal, sending, by the default controller, the management IP obtaining request to the manager.

In one embodiment, when the default controller monitors that a state attribute of a controller including the default controller is abnormal, the method further includes: keeping sending, by the default controller, management IP obtaining requests to the manager, or sending, by the default controller, management IP obtaining requests to the manager based on a preset management IP obtaining request sending interval.

In one embodiment, when the manager does not monitor that a state attribute of any controller in the storage frame is abnormal, the method further includes: keeping receiving, by the manager, management IP obtaining requests sent by the default controller, or receiving, by the manager, management IP obtaining requests sent by the default controller based on a preset management IP obtaining request receiving interval.

In one embodiment, the obtaining a state attribute of the controller includes: ascertaining whether a system management port corresponding to the controller has an error code; ascertaining whether a system management link on which the controller is located is down; and if the system management port corresponding to the controller has the error code and/or the system management link on which the controller is located is down, determining that the state attribute of the controller is abnormal; or if the system management port corresponding to the controller does not have the error code and/or the system management link on which the controller is located is not down, determining that the state attribute of the target controller is normal.

In one embodiment, the target controller sends the management IP abandonment request to the manager only when monitoring that the state attribute of the target controller is abnormal, to avoid excessive occupation of system resources while ensuring that a link or a controller on which the management IP is located is normal.

In one embodiment, the method further includes: releasing management IP drift permission of the default controller. Releasing the management IP drift permission of the controller means that for a controller that cannot have the management IP, that is, when the state attribute of the target controller is abnormal or the controller corresponding to the management IP setting request delivered by the user is abnormal, the management IP cannot drift to the controller.

In one embodiment, the releasing management IP drift permission of the default controller includes: obtaining a state attribute of the controller, and when the state attribute of the controller is abnormal, releasing the management IP drift permission of the controller.

In one embodiment, the obtaining a state attribute of the controller, and when the state attribute of the controller is abnormal, releasing the management IP drift permission of the controller includes: obtaining, by the controller, the state attribute of the controller, and when the state attribute of the controller is abnormal, sending a management IP drift release request to the manager, so that the manager releases the management IP drift permission of the controller.

In one embodiment, the obtaining a state attribute of the controller, and when the state attribute of the controller is abnormal, releasing the management IP drift permission of the controller includes: obtaining, by the manager, the state attribute of the controller, and when the state attribute of the controller is abnormal, releasing, by the manager, the management IP drift permission of the controller.

In one embodiment, the releasing the management IP drift permission of the controller further includes: receiving, by the manager, a management IP drift request based on a preset management IP drift request receiving period; and when the manager does not receive the management IP drift request within the preset management IP drift request receiving period, releasing the management IP drift permission of the controller.

In one embodiment, the obtaining a state attribute of the controller includes: when the controller is the target controller, ascertaining whether a system management port corresponding to the target controller has an error code and whether a system management link on which the target controller is located is down; and if the system management port corresponding to the target controller has the error code and/or the system management link on which the target controller is located is down, determining that the state attribute of the target controller is abnormal; or if the system management port corresponding to the target controller does not have the error code and/or the system management link on which the target controller is located is not down, determining that the state attribute of the target controller is normal.

In one embodiment, the obtaining a state attribute of the controller further includes: when the controller is the default controller, ascertaining whether a system management link on which the default controller is located is down; and if the system management link on which the default controller is located is down, determining that the state attribute of the default controller is abnormal; or if the system management link on which the default controller is located is not down, determining that the state attribute of the default controller is normal. It should be understood that a system management link on which a controller is located includes, but is not limited to, a communication link between a baseboard management controller of the controller and the baseboard management controller of the manager, and when the controller is the target controller, the system management link further includes a link between the baseboard management controller of the target controller and the system management port.

Embodiment 2

Figure 5:
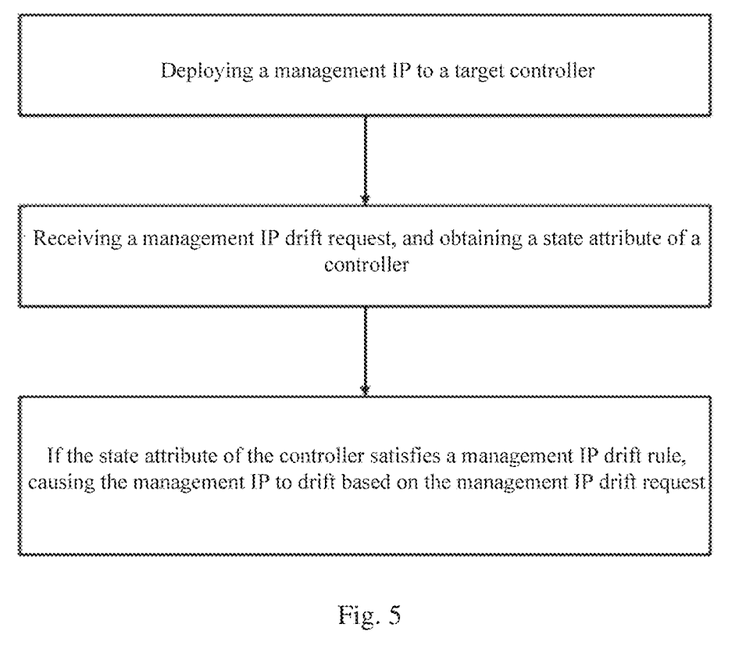
FIG. 5 is a schematic flowchart of a management IP drift method according to an embodiment.

In an embodiment, there is provided a management IP drift method. As shown in FIG. 5, the method is applied to a manager. The manager is interconnected with at least two controllers. The method includes: deploying a management IP to a target controller, where the controllers include the target controller, and the target controller is unique; receiving a management IP drift request, and obtaining a state attribute of a controller; and if the state attribute of the controller satisfies a management IP drift rule, causing, based on the management IP drift request, the management IP to drift.

In one embodiment, the deploying a management IP to a target controller includes: receiving, by the manager, management IP obtaining requests sent by the controllers, where the management IP drift request includes the management IP obtaining request; and obtaining, by the manager, the target controller corresponding to a management IP obtaining request that is received first, and deploying the management IP to the target controller.

In one embodiment, the deploying a management IP to a target controller further includes: receiving, by the manager, a management IP setting request delivered by a user, where the management IP drift request includes the management IP setting request; and obtaining, by the manager, the target controller corresponding to the management IP setting request, and deploying the management IP to the target controller.

In one embodiment, the receiving a management IP drift request, and obtaining a state attribute of a controller includes: receiving, by the manager, the management IP setting request delivered by the user, and obtaining a state attribute of a controller corresponding to the management IP setting request; receiving, by the manager, a management IP obtaining request sent by a default controller, and obtaining a state attribute of the target controller, where the default controller is a controller other than the target controller; and receiving, by the manager, a management IP abandonment request sent by the target controller, and obtaining a state attribute of the default controller.

In one embodiment, the management IP drift rule includes: when the management IP drift request is the management IP abandonment request sent by the target controller, causing the management IP to drift to the default controller whose state attribute is normal.

In one embodiment, the management IP drift rule includes: when the management IP drift request is the management IP obtaining request sent by the default controller, and the state attribute of the target controller is abnormal, causing the management IP to drift to the default controller.

In one embodiment, the management IP drift rule includes: when the management IP drift request is the management IP setting request delivered by the user, and the state attribute of the controller corresponding to the management IP setting request is normal, causing the management IP to drift to the controller corresponding to the management IP setting request.

In one embodiment, the method further includes: when the default controller monitors that a state attribute of a controller other than the default controller is abnormal, sending, by the default controller, the management IP obtaining request to the manager.

In one embodiment, the method further includes: when the manager monitors that a state attribute of any controller is abnormal, receiving, by the manager, the management IP obtaining request sent by the default controller.

In one embodiment, the method further includes: releasing management IP drift permission of the controller. The releasing management IP drift permission of the controller includes: obtaining a state attribute of the controller, and when the state attribute of the controller is abnormal, releasing the management IP drift permission of the controller.

In one embodiment, the obtaining a state attribute of the controller, and when the state attribute of the controller is abnormal, releasing the management IP drift permission of the controller includes: obtaining, by the controller, the state attribute of the controller, and when the state attribute of the controller is abnormal, sending a management IP drift release request to the manager, so that the manager releases the management IP drift permission of the controller.

In one embodiment, the obtaining a state attribute of the controller, and when the state attribute of the controller is abnormal, releasing the management IP drift permission of the controller includes: obtaining, by the manager, the state attribute of the controller, and when the state attribute of the controller is abnormal, releasing, by the manager, the management IP drift permission of the controller.

In one embodiment, the obtaining, by the manager, the state attribute of the controller, and when the state attribute of the controller is abnormal, releasing, by the manager, the management IP drift permission of the controller includes: receiving, by the manager based on a preset management IP drift request receiving period, a management IP drift request sent by the default controller; and when the manager does not receive, within the preset management IP drift request receiving period, the management IP drift request sent by the default controller, releasing the management IP drift permission of the controller.

In one embodiment, the obtaining a state attribute of the controller includes: when the controller is the target controller, ascertaining whether a system management port corresponding to the target controller has an error code and whether a system management link on which the target controller is located is down; and if the system management port corresponding to the target controller has the error code and/or the system management link on which the target controller is located is down, determining that the state attribute of the target controller is abnormal; or if the system management port corresponding to the target controller does not have the error code and/or the system management link on which the target controller is located is not down, determining that the state attribute of the target controller is normal.

In one embodiment, the obtaining a state attribute of the controller further includes: when the controller is the default controller, ascertaining whether a system management link on which the default controller is located is down; and if the system management link on which the default controller is located is down, determining that the state attribute of the default controller is abnormal; or if the system management link on which the default controller is located is not down, determining that the state attribute of the default controller is normal.

In one embodiment, the manager includes a master manager and a slave manager. The method further includes: establishing a heartbeat connection to the master manager and the slave manager; and when the master manager is in a normal state, performing the following steps based on the master manager: deploying a management IP to a target controller, where the controllers include the target controller, and the target controller is unique; receiving a management IP drift request, and obtaining a state attribute of a controller; and causing the management IP to drift based on the state attribute of the controller and the management IP drift request; or when the master manager is not in a normal state, performing the following steps based on the slave manager: deploying a management IP to a target controller, where the controllers include the target controller, and the target controller is unique; receiving a management IP drift request, and obtaining a state attribute of a controller; and causing the management IP to drift based on the state attribute of the controller and the management IP drift request.

It should be understood that although the steps in the flowcharts in FIG. 2 to FIG. 4 are sequentially presented according to indications of arrowheads, these steps are not necessarily performed in sequences indicated by the arrowheads. Unless clearly indicated herein, execution of the steps is not strictly restricted in sequence, and the steps can be performed in another sequence. Moreover, at least some steps in FIG. 2 to FIG. 4 may include a plurality of sub-steps or a plurality of phases. The sub-steps or phases are not necessarily performed at the same time, and may be performed at different time. The sub-steps or phases are not necessarily performed in order, and may be performed in turn or alternately with other steps or at least some sub-steps or phases of other steps.

Embodiment 3

In an embodiment, as shown in FIG. 1, there is provided a storage frame, including controllers and managers.

The manager is configured to deploy a management IP to a target controller, where the controllers include the target controller, and the target controller is unique.

The manager is further configured to receive a management IP drift request, and obtain a state attribute of the controller.

The manager is further configured to: if the state attribute of the controller satisfies a management IP drift rule, cause the management IP to drift based on the management IP drift request.

In one embodiment, the manager is further configured to receive management IP obtaining requests sent by the controllers, where the management IP drift request includes the management IP obtaining request. The manager is further configured to obtain the target controller corresponding to a management IP obtaining request that is received first, and deploy the management IP to the target controller.

In one embodiment, the manager is further configured to receive a management IP setting request delivered by a user, where the management IP drift request includes the management IP setting request. The manager is further configured to obtain the target controller corresponding to the management IP setting request, and deploy the management IP to the target controller.

In one embodiment, the manager is further configured to receive the management IP setting request delivered by the user, and obtain a state attribute of a controller corresponding to the management IP setting request. The manager is further configured to receive a management IP obtaining request sent by a default controller, and obtain a state attribute of the target controller, where the default controller is a controller other than the target controller. The manager is further configured to receive a management IP abandonment request sent by the target controller, and obtain a state attribute of the default controller.

In one embodiment, when the management IP drift request is the management IP abandonment request sent by the target controller, the manager is further configured to cause the management IP to drift to the default controller whose state attribute is normal.

In one embodiment, when the management IP drift request is the management IP obtaining request sent by the default controller, and the state attribute of the target controller is abnormal, the manager is further configured to cause the management IP to drift to the default controller.

In one embodiment, when the management IP drift request is the management IP setting request delivered by the user, and the state attribute of the controller corresponding to the management IP setting request is normal, the manager is further configured to cause the management IP to drift to the controller corresponding to the management IP setting request.

In one embodiment, when the default controller monitors that a state attribute of a controller other than the default controller is abnormal, the default controller is further configured to send the management IP obtaining request to the manager.

In one embodiment, when the manager monitors that a state attribute of any controller is abnormal, the manager is further configured to receive the management IP obtaining request sent by the default controller.

In one embodiment, the controller is further configured to obtain the state attribute of the controller. The controller is further configured to: when the state attribute of the controller is abnormal, send a management IP drift release request to the manager, so that the manager releases the management IP drift permission of the controller.

In one embodiment, the manager is configured to obtain a state attribute of the controller. The manager is further configured to: when the state attribute of the controller is abnormal, release the management IP drift permission of the controller.

In one embodiment, the manager is further configured to receive a management IP drift request based on a preset management IP drift request receiving period. The manager is further configured to: when the manager does not receive, within the preset management IP drift request receiving period, the management IP drift request sent by the default controller, release the management IP drift permission of the controller.

In one embodiment, when the controller is the target controller, the target controller or the manager is further configured to ascertain whether a system management port corresponding to the target controller has an error code and whether a system management link on which the target controller is located is down. The target controller or the manager is further configured to: if the system management port corresponding to the target controller has the error code and/or the system management link on which the target controller is located is down, determine that the state attribute of the target controller is abnormal; or if the system management port corresponding to the target controller does not have the error code and/or the system management link on which the target controller is located is not down, determine that the state attribute of the target controller is normal.

In one embodiment, when the controller is the default controller, the target controller of the manager is further configured to ascertain whether a system management link on which the default controller is located is down. The target controller or the manager is further configured to: if the system management link on which the default controller is located is down, determine that the state attribute of the default controller is abnormal; or if the system management link on which the default controller is located is not down, determine that the state attribute of the default controller is normal.

In one embodiment, the storage frame further includes a heartbeat establishment unit, configured to establish a heartbeat connection to a master manager and a slave manager. When the master manager is in a normal state, the master manager is configured to perform a management IP drift method; or when the master manager is not in a normal state, the slave manager is configured to perform a management IP drift method.

Embodiment 4

Figure 6:
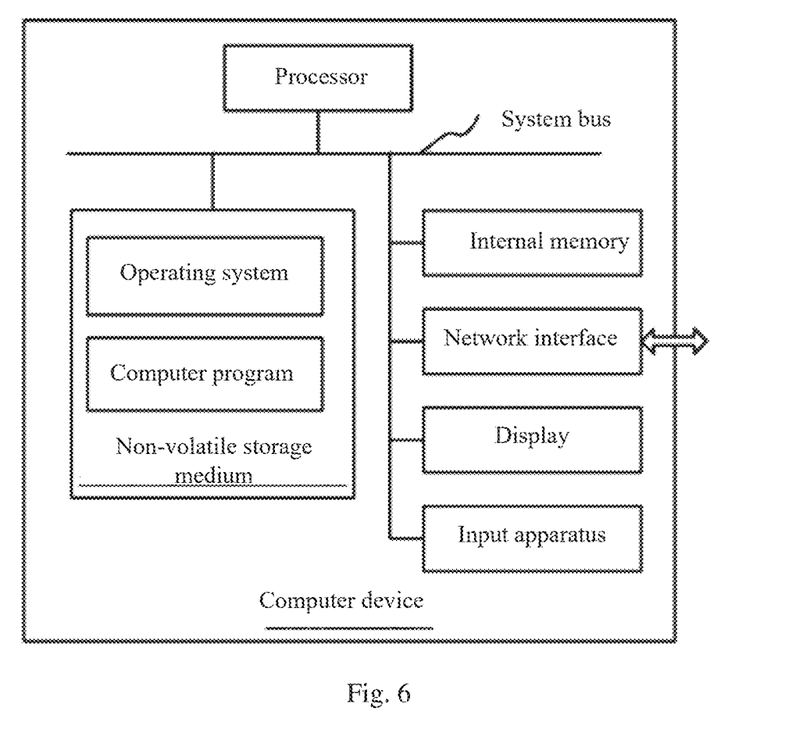
FIG. 6 is a diagram of an internal structure of a computer device according to an embodiment.

In one embodiment, there is provided a computer device. The computer device may be a terminal, and a diagram of an internal structure of the computer device may be as shown in FIG. 6. The computer device includes a processor, a memory, a network interface, a display, and an input apparatus that are connected through a system bus. The processor of the computer device is configured to provide computing and control capabilities. The memory of the computer device includes a non-volatile storage medium and an internal memory. The non-volatile storage medium stores an operating system and a computer program. The internal memory provides a running environment for the operating system and the computer program in the non-volatile storage medium. The network interface of the computer device is configured to be connected to an external terminal through a network for communication. When computer program is executed by the processor, a management IP drift method is implemented. The display of the computer device may be a liquid crystal display or an e-in display. The input apparatus of the computer device may be a touch layer on the display, may be a button, a trackball, or a touchpad arranged on a housing of the computer device, or may be an external keyboard, touchpad, or mouse.

A person skilled in the art may understand that the structure shown in FIG. 6 is merely a block diagram of a partial structure related to the solutions of the present application and not intended to limit the computer device to which the solutions of the present application are applied. The computer device may specifically include more or fewer components than those shown in the figure, some components are combined, or different component arrangements are used.

In an embodiment, there is provided a computer device, including a memory, a processor, and a computer program stored in the memory and runnable on the processor, where when the processor executes the computer program, the following steps are implemented:

deploying a management IP to a target controller, where controllers include the target controller, and the target controller is unique;

receiving a management IP drift request, and obtaining a state attribute of a controller; and if the state attribute of the controller satisfies a management IP drift rule, causing the management IP to drift based on the management IP drift request.

In an embodiment, when the processor executes the computer program, the following steps are further implemented: receiving, by a manager, management IP obtaining requests sent by the controllers, where the management IP drift request includes the management IP obtaining request; and obtaining, by the manager, the target controller corresponding to a management IP obtaining request that is received first, and deploying the management IP to the target controller.

In an embodiment, when the processor executes the computer program, the following steps are further implemented: receiving, by the manager, a management IP setting request delivered by a user, where the management IP drift request includes the management IP setting request; and obtaining, by the manager, the target controller corresponding to the management IP setting request, and deploying the management IP to the target controller.

In an embodiment, when the processor executes the computer program, the following steps are further implemented: receiving, by the manager, the management IP setting request delivered by the user, and obtaining a state attribute of a controller corresponding to the management IP setting request; receiving, by the manager, a management IP obtaining request sent by a default controller, and obtaining a state attribute of the target controller, where the default controller is a controller other than the target controller; and receiving, by the manager, a management IP abandonment request sent by the target controller, and obtaining a state attribute of the default controller.

In an embodiment, when the processor executes the computer program, the following step is further implemented: when the management IP drift request is the management IP abandonment request sent by the target controller, causing the management IP to drift to the default controller whose state attribute is normal.

In an embodiment, when the processor executes the computer program, the following step is further implemented: when the management IP drift request is the management IP obtaining request sent by the default controller, and the state attribute of the target controller is abnormal, causing the management IP to drift to the default controller.

In an embodiment, when the processor executes the computer program, the following step is further implemented: when the management IP drift request is the management IP setting request delivered by the user, and the state attribute of the controller corresponding to the management IP setting request is normal, causing the management IP to drift to the controller corresponding to the management IP setting request.

In an embodiment, when the processor executes the computer program, the following step is further implemented: when the default controller monitors that a state attribute of a controller other than the default controller is abnormal, sending, by the default controller, the management IP obtaining request to the manager.

In an embodiment, when the processor executes the computer program, the following step is further implemented: when the manager monitors that a state attribute of any controller is abnormal, receiving, by the manager, the management IP obtaining request sent by the default controller.

In an embodiment, when the processor executes the computer program, the following steps are further implemented: obtaining a state attribute of the controller, and when the state attribute of the controller is abnormal, releasing the management IP drift permission of the controller.

In an embodiment, when the processor executes the computer program, the following steps are further implemented: obtaining, by the controller, the state attribute of the controller, and when the state attribute of the controller is abnormal, sending a management IP drift release request to the manager, so that the manager releases the management IP drift permission of the controller.

In an embodiment, when the processor executes the computer program, the following steps are further implemented: obtaining, by the manager, the state attribute of the controller, and when the state attribute of the controller is abnormal, releasing, by the manager, the management IP drift permission of the controller.

In an embodiment, when the processor executes the computer program, the following steps are further implemented: receiving, by the manager based on a preset management IP drift request receiving period, a management IP drift request sent by the default controller; and when the manager does not receive, within the preset management IP drift request receiving period, the management IP drift request sent by the default controller, releasing the management IP drift permission of the controller.

In an embodiment, when the processor executes the computer program, the following steps are further implemented: when the controller is the target controller, ascertaining whether a system management port corresponding to the target controller has an error code and whether a system management link on which the target controller is located is down; and if the system management port corresponding to the target controller has the error code and/or the system management link on which the target controller is located is down, determining that the state attribute of the target controller is abnormal; or if the system management port corresponding to the target controller does not have the error code and/or the system management link on which the target controller is located is not down, determining that the state attribute of the target controller is normal.

In an embodiment, when the processor executes the computer program, the following steps are further implemented: when the controller is the default controller, ascertaining whether a system management link on which the default controller is located is down; and if the system management link on which the default controller is located is down, determining that the state attribute of the default controller is abnormal; or if the system management link on which the default controller is located is not down, determining that the state attribute of the default controller is normal.

In an embodiment, when the processor executes the computer program, the following steps are further implemented: establishing a heartbeat connection to a master manager and a slave manager; and when the master manager is in a normal state, performing the following steps based on the master manager: deploying a management IP to a target controller, where controllers include the target controller, and the target controller is unique; receiving a management IP drift request, and obtaining a state attribute of a controller; and causing the management IP to drift based on the state attribute of the controller and the management IP drift request; or when the master manager is not in a normal state, performing the following steps based on the slave manager: deploying a management IP to a target controller, where controllers include the target controller, and the target controller is unique; receiving a management IP drift request, and obtaining a state attribute of a controller; and causing the management IP to drift based on the state attribute of the controller and the management IP drift request.

Embodiment 5

In an embodiment, there is provided a non-volatile computer-readable storage medium having stored thereon a computer program, where when the computer program is executed by a processor, the following steps are implemented:

deploying a management IP to a target controller, where controllers include the target controller, and the target controller is unique;

receiving a management IP drift request, and obtaining a state attribute of a controller; and if the state attribute of the controller satisfies a management IP drift rule, causing the management IP to drift based on the management IP drift request.

In an embodiment, when the computer program is executed by the processor, the following steps are further implemented: receiving, by a manager, management IP obtaining requests sent by the controllers, where the management IP drift request includes the management IP obtaining request; and obtaining, by the manager, the target controller corresponding to a management IP obtaining request that is received first, and deploying the management IP to the target controller.

In an embodiment, when the computer program is executed by the processor, the following steps are further implemented: receiving, by the manager, a management IP setting request delivered by a user, where the management IP drift request includes the management IP setting request; and obtaining, by the manager, the target controller corresponding to the management IP setting request, and deploying the management IP to the target controller.

In an embodiment, when the computer program is executed by the processor, the following steps are further implemented: receiving, by the manager, the management IP setting request delivered by the user, and obtaining a state attribute of a controller corresponding to the management IP setting request; receiving, by the manager, a management IP obtaining request sent by a default controller, and obtaining a state attribute of the target controller, where the default controller is a controller other than the target controller; and receiving, by the manager, a management IP abandonment request sent by the target controller, and obtaining a state attribute of the default controller.

In an embodiment, when the computer program is executed by the processor, the following step is further implemented: when the management IP drift request is the management IP abandonment request sent by the target controller, causing the management IP to drift to the default controller whose state attribute is normal.

In an embodiment, when the computer program is executed by the processor, the following step is further implemented: when the management IP drift request is the management IP obtaining request sent by the default controller, and the state attribute of the target controller is abnormal, causing the management IP to drift to the default controller.

In an embodiment, when the computer program is executed by the processor, the following step is further implemented: when the management IP drift request is the management IP setting request delivered by the user, and the state attribute of the controller corresponding to the management IP setting request is normal, causing the management IP to drift to the controller corresponding to the management IP setting request.

In an embodiment, when the computer program is executed by the processor, the following step is further implemented: when the default controller monitors that a state attribute of a controller other than the default controller is abnormal, sending, by the default controller, the management IP obtaining request to the manager.

In an embodiment, when the computer program is executed by the processor, the following step is further implemented: when the manager monitors that a state attribute of any controller is abnormal, receiving, by the manager, the management IP obtaining request sent by the default controller.

In an embodiment, when the processor executes the computer program, the following steps are further implemented: obtaining a state attribute of the controller, and when the state attribute of the controller is abnormal, releasing the management IP drift permission of the controller.

In an embodiment, when the computer program is executed by the processor, the following steps are further implemented: obtaining, by the controller, the state attribute of the controller, and when the state attribute of the controller is abnormal, sending a management IP drift release request to the manager, so that the manager releases the management IP drift permission of the controller.

In an embodiment, when the computer program is executed by the processor, the following steps are further implemented: obtaining, by the manager, the state attribute of the controller, and when the state attribute of the controller is abnormal, releasing, by the manager, the management IP drift permission of the controller.

In an embodiment, when the computer program is executed by the processor, the following steps are further implemented: receiving, by the manager based on a preset management IP drift request receiving period, a management IP drift request sent by the default controller; and when the manager does not receive, within the preset management IP drift request receiving period, the management IP drift request sent by the default controller, releasing the management IP drift permission of the controller.

In an embodiment, when the computer program is executed by the processor, the following steps are further implemented: when the controller is the target controller, ascertaining whether a system management port corresponding to the target controller has an error code and whether a system management link on which the target controller is located is down; and if the system management port corresponding to the target controller has the error code and/or the system management link on which the target controller is located is down, determining that the state attribute of the target controller is abnormal; or if the system management port corresponding to the target controller does not have the error code and/or the system management link on which the target controller is located is not down, determining that the state attribute of the target controller is normal.

In an embodiment, when the computer program is executed by the processor, the following steps are further implemented: when the controller is the default controller, ascertaining whether a system management link on which the default controller is located is down; and if the system management link on which the default controller is located is down, determining that the state attribute of the default controller is abnormal; or if the system management link on which the default controller is located is not down, determining that the state attribute of the default controller is normal.

In an embodiment, when the computer program is executed by the processor, the following steps are further implemented: establishing a heartbeat connection to a master manager and a slave manager; and when the master manager is in a normal state, performing the following steps based on the master manager: deploying a management IP to a target controller, where controllers include the target controller, and the target controller is unique; receiving a management IP drift request, and obtaining a state attribute of a controller; and causing the management IP to drift based on the state attribute of the controller and the management IP drift request; or when the master manager is not in a normal state, performing the following steps based on the slave manager: deploying a management IP to a target controller, where controllers include the target controller, and the target controller is unique; receiving a management IP drift request, and obtaining a state attribute of a controller; and causing the management IP to drift based on the state attribute of the controller and the management IP drift request.

It can be understood by a person of ordinary skill in the art that all or part of the processes in the method of the embodiments may be completed by a computer program by instructing related hardware. The computer program may be stored in a non-volatile computer-readable storage medium. When the computer program is executed, the processes of each of the method embodiments may be included. All the memory, storage, database, or other media used in the embodiments provided in the present application may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an example rather than a restriction, the RAM may be obtained in various forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a rambus direct RAM (RDRAM), a direct RDRAM (DRDRAM), and a rambus dynamic RAM (RDRAM).

The technical features in the foregoing embodiments may be combined in any manner. To make the description brief, not all possible combinations of the technical features in the foregoing embodiments are described. However, provided that the combinations of the technical features do not conflict with each other, the combinations should be considered as falling within the scope recorded in this specification.

The foregoing embodiments merely illustrate several implementations of the present application, and the description thereof is specifically and detailed, but it should not be construed as a limitation on the patent scope of the present application. It should be noted that a person of ordinary skill in the art may make several variants and improvements without departing from the concept of the present application and the variants and improvements shall fall within the protection scope of the present application. Therefore, the protection scope of the present application shall be subject to the protection scope of the appended claims.

What is claimed is:

1. A management Internet protocol (IP) drift method, wherein the method is applied to a manager, the manager is interconnected with at least two controllers, and the method comprises:
    deploying a management IP to a target controller, wherein the at least two controllers comprise the target controller, and the target controller is unique;
    receiving a management IP drift request, and obtaining a state attribute of a controller; and
    in response to the state attribute of the controller satisfying a management IP drift rule, causing the management IP to drift based on the management IP drift request.

2. The management IP drift method according to claim 1, wherein the deploying a management IP to a target controller comprises:
    receiving, by the manager, management IP obtaining requests sent by the at least two controllers, wherein the management IP drift request comprises the management IP obtaining requests; and
    obtaining, by the manager, the target controller corresponding to a management IP obtaining request of the management IP obtaining requeststhat is received first, and deploying the management IP to the target controller.

3. The management IP drift method according to claim 1, wherein the deploying a management IP to a target controller comprises:
    receiving, by the manager, a management IP setting request delivered by a user, wherein the management IP drift request comprises the management IP setting request; and
    obtaining, by the manager, the target controller corresponding to the management IP setting request, and deploying the management IP to the target controller.

4. The management IP drift method according to claim 3, wherein the receiving a management IP drift request, and obtaining a state attribute of a controller comprises:
    receiving, by the manager, a management IP setting request delivered by a user, and obtaining a state attribute of a controller corresponding to the management IP setting request;
    receiving, by the manager, a management IP obtaining request sent by a default controller, and obtaining a state attribute of the target controller, wherein the default controller is a controller other than the target controller; and
    receiving, by the manager, a management IP abandonment request sent by the target controller, and obtaining a state attribute of the default controller.

5. The management IP drift method according to claim 4, wherein the management IP drift rule comprises:
    in response to the management IP drift request being the management IP abandonment request sent by the target controller, causing the management IP to drift to the default controller whose state attribute is normal.

6. The management IP drift method according to claim 4, wherein the management IP drift rule comprises:
    in response to the management IP drift request being the management IP obtaining request sent by the default controller, and the state attribute of the target controller being abnormal, causing the management IP to drift to the default controller.

7. The management IP drift method according to claim 4, wherein the management IP drift rule comprises:
    in response to the management IP drift request being the management IP setting request delivered by the user, and the state attribute of the controller corresponding to the management IP setting request being normal, causing the management IP to drift to the controller corresponding to the management IP setting request.

8. The management IP drift method according to claim 5, wherein the method further comprises:
    in response to the default controller monitoring that a state attribute of a controller other than the default controller is abnormal, sending, by the default controller, the management IP obtaining request to the manager.

9. The management IP drift method according to claim 5, wherein the method further comprises:
    in response to the manager monitoring that a state attribute of any controller is abnormal, receiving, by the manager, the management IP obtaining request sent by the default controller.

10. The management IP drift method according to claim 9, wherein the method further comprises: releasing management IP drift permission of the controller, wherein
    the releasing management IP drift permission of the controller comprises:
        obtaining the state attribute of the controller, and in response to the state attribute of the controller being abnormal, releasing the management IP drift permission of the controller.

11. The management IP drift method according to claim 10, wherein the obtaining the state attribute of the controller, and in response to the state attribute of the controller being abnormal, releasing the management IP drift permission of the controller comprises:
    obtaining, by the controller, the state attribute of the controller, and in response to the state attribute of the controller being abnormal, sending a management IP drift release request to the manager, so that the manager releases the management IP drift permission of the controller.

12. The management IP drift method according to claim 10, wherein the obtaining the state attribute of the controller, and in response to the state attribute of the controller being abnormal, releasing the management IP drift permission of the controller comprises:
  obtaining, by the manager, the state attribute of the controller, and in response to the state attribute of the controller being abnormal, releasing, by the manager, the management IP drift permission of the controller.

13. The management IP drift method according to claim 12, wherein the obtaining, by the manager, the state attribute of the controller, and in response to the state attribute of the controller being abnormal, releasing, by the manager, the management IP drift permission of the controller comprises:
  receiving, by the manager based on a preset management IP drift request receiving period, a management IP drift request sent by the default controller; and
  in response to the manager not receiving, within the preset management IP drift request receiving period, the management IP drift request sent by the default controller, releasing the management IP drift permission of the controller.

14. The management IP drift method according to claim 11, wherein the obtaining the state attribute of the controller comprises:
  in response to the controller being the target controller, ascertaining whether a system management port corresponding to the target controller has an error code and whether a system management link on which the target controller is located is down;
  in response to at least one of the system management port corresponding to the target controller having the error code or the system management link on which the target controller is located being down, determining that the state attribute of the target controller is abnormal; and
  in response to the system management port corresponding to the target controller not having the error code and the system management link on which the target controller is located being not down, determining that the state attribute of the target controller is normal.

15. The management IP drift method according to claim 14, wherein the obtaining the state attribute of the controller further comprises:
  in response to the controller being the default controller, ascertaining whether a system management link on which the default controller is located is down;
  in response to the system management link on which the default controller is located being down, determining that the state attribute of the default controller is abnormal; and
  in response to the system management link on which the default controller is located being not down, determining that the state attribute of the default controller is normal.

16. The management IP drift method according to claim 15, wherein the manager comprises a master manager and a slave manager, and the method further comprises:

establishing a heartbeat connection to the master manager and the slave manager; and
  in response to the master manager being in a normal state, deploying, by the master manager, the management IP to the target controller; receiving, by the master manager, the management IP drift request; obtaining, by the master manager, the state attribute of the controller; and in response to the state attribute of the controller satisfying the management IP drift rule, causing, by the master manager, the management IP to drift based on the management IP drift request; and
  in response to the master manager not being in the normal state, deploying, by the slave manager, the management IP to the target controller; receiving, by the slave manager, the management IP drift request; obtaining, by the slave manager, the state attribute of the controller; and in response to the state attribute of the controller satisfying the management IP drift rule, causing, by the slave manager, the management IP to drift based on the management IP drift request.

17. A storage frame, comprising controllers and a manager, wherein
  the manager is configured to deploy a management Internet protocol (IP) to a target controller, wherein the controllers comprise the target controller, and the target controller is unique;
  the manager is further configured to receive a management IP drift request, and obtain a state attribute of a controller; and
  the manager is further configured to in response to the state attribute of the controller satisfying a management IP drift rule, cause the management IP to drift based on the management IP drift request.

18. A server, comprising the storage frame according to claim 17.

19. A computer device, comprising a memory, a processor, and a computer program stored in the memory and runnable on the processor wherein when the processor executes the computer program, the computer program is configured to cause the processor to perform a method applied to a manager, wherein the manager is interconnected with at least two controllers, and the method comprises:
  deploying a management IP to a target controller, wherein the at least two controllers comprise the target controller, and the target controller is unique;
  receiving a management IP drift request, and obtaining a state attribute of a controller; and
  in response to the state attribute of the controller satisfying a management IP drift rule, causing the management IP to drift based on the management IP drift request.

20. The computer device according to claim 19, wherein when the processor executes the computer program, and the computer program is configured to cause the processor to:
  receive, by the manager, management IP obtaining requests sent by the controllers, wherein the management IP drift request comprises the management IP obtaining request; and
  obtain, by the manager, the target controller corresponding to a management IP obtaining request that is received first, and deploying the management IP to the target controller.

* * * * *